United States Patent [19]

Orloff et al.

[11] 4,355,870
[45] Oct. 26, 1982

[54] RHOMBOID PRISM PAIR FOR ROTATING THE PLANE OF PARALLEL LIGHT BEAMS

[76] Inventors: Alan M. Lovelace, Administrator of the National Aeronautics and Space Administration, with respect to an invention of Kenneth L. Orloff; Haruo Yanagita, both of Cupertino, Calif.

[21] Appl. No.: 219,640

[22] Filed: Dec. 24, 1980

[51] Int. Cl.$^3$ .............................................. G02B 7/18
[52] U.S. Cl. .................................... 350/486; 350/287
[58] Field of Search .................. 350/286, 287, 31, 33, 350/35, 36, 75, 171, 320, 486

[56] References Cited

U.S. PATENT DOCUMENTS 3,909,106  9/1975  Buhler ................................. 350/51

*Primary Examiner*—Jon W. Henry
*Attorney, Agent, or Firm*—Darrell G. Brekke; John R. Manning

[57] ABSTRACT

The object of the invention is to provide an optical system for rotating the plane defined by a pair of parallel light beams.

In one embodiment (see FIG. 4) a single pair of rhomboid prisms 36 and 37 have their respective input faces 15 disposed to receive the respective input beams 21 and 22. Each prism is rotated about an axis of revolution coaxial with each of the respective input beams 21 and 22 by means of a suitable motor 29 and gear arrangement 41 to cause the plane of the parallel output beams 21' and 22' to be rotated relative to the plane of the input beams.

In a second embodiment, two pairs (FIG. 2) of rhomboid prisms 23, 24 and 31, 32 are provided. In a first angular orientation of the output beams, prisms 23 and 24 serve to merely decrease the lateral displacement of the output beams for keeping the beams in the same plane as the input beams. In a second angular orientation of the prisms (FIG. 3) the input faces of the second pair of prisms 31 and 32 are brought into coincidence with the input beams for rotating the plane of the output beams 21' and 22' by a substantial angle such as 90°.

6 Claims, 6 Drawing Figures

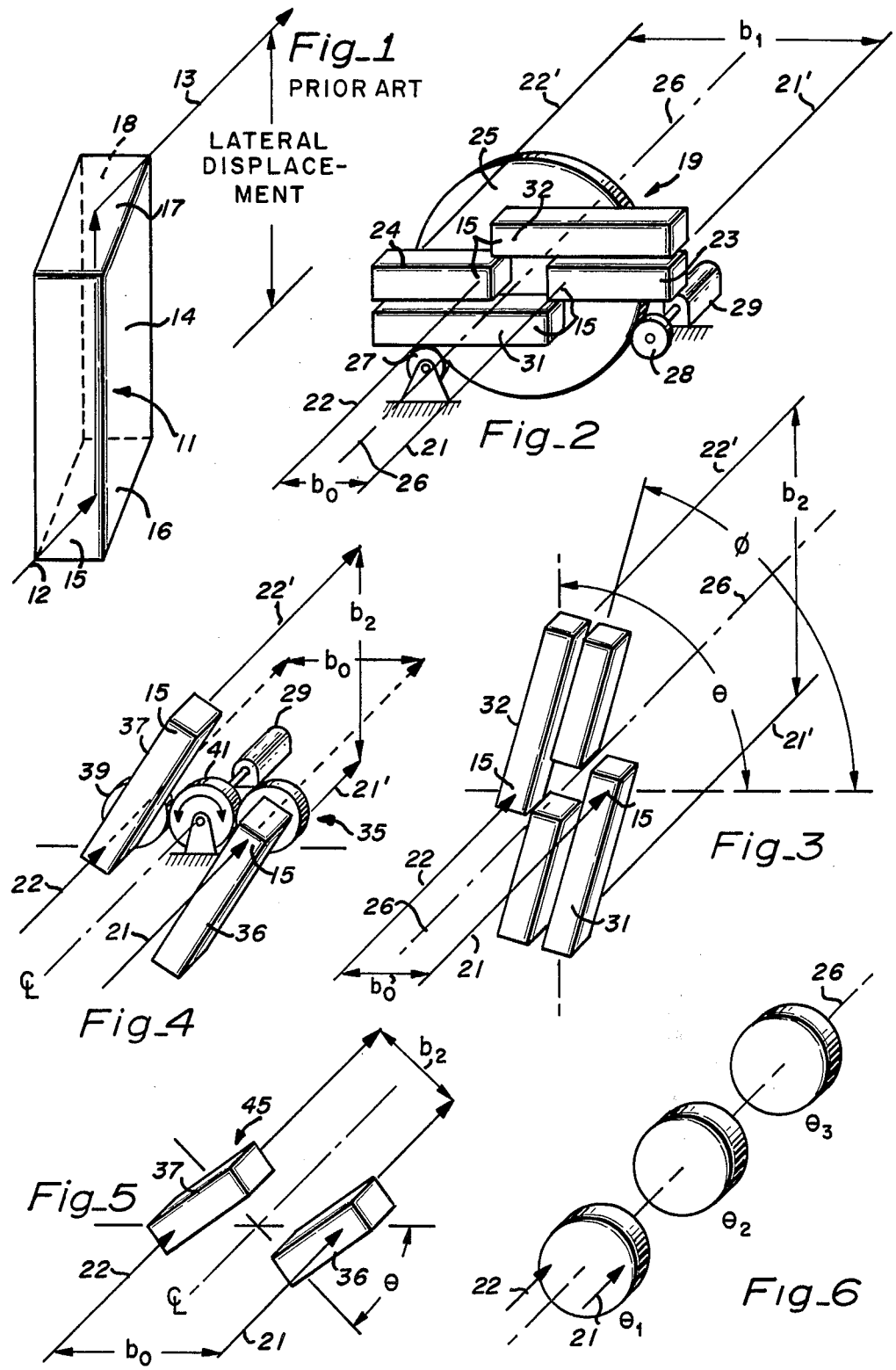

4,355,870

RHOMBOID PRISM PAIR FOR ROTATING THE PLANE OF PARALLEL LIGHT BEAMS

ORIGIN OF THE INVENTION

The invention described herein was made in the performance of work under a NASA contract and is subject to the provision of such Section 305 of the National Aeronautics and Space Act of 1958, Public Law 85-568 (72 Stat. 435; 42 U.S.C 2457).

TECHNICAL FIELD

The present invention relates in general to optical systems for rotating the plane defined by a pair of parallel light beams and, more particularly, to an improved optical system utilizing pairs of rhomboid prisms.

BACKGROUND ART

Heretofore, both the dove and the pechan prism have been proposed for use as optical image rotators. In each case, as the prism is rotated, the image passing therethrough will rotate at twice the angular rate of the prism. These prisms, therefore, have the advantage of selecting any desired rotation angle. However, they have disadvantages with respect to rotating the plane of a pair of parallel light beams as follows:

With regard to the dove prism, this is typically a very long prism, the length is usually 4 to 5 times the input aperture, i.e., the lateral beam separation in the case of rotating the plane of a pair of parallel beams. Where compactness is a requirement, this prism is not usually acceptable. In addition, to function correctly, the rotation axis of the dove prism must be precisely aligned with the optical axis of the optical system. Furthermore, the dove prism is not achromatic and will not perform equally for light beams of different wavelengths.

With regard to the pechan prism, this prism is typically very large, i.e., the length and lateral dimensions are both nominally twice the input aperture. This is not compatible with compactness. This type of prism is formed by a pair of air spaced prism elements. These elements must be accurately positioned relative to one another and the dimensions and uniformity of the air space must be exact if the rotation is to function correctly. Moreover, two of the prism surfaces must be reflectively coated. If aluminized coatings are used, measureable light losses will occur. If dielectric coatings are used, the prism becomes non-achromatic.

[STATEMENT OF INVENTION]

Disclosure of Invention

In the present invention, the plane defined by first and second parallel light beams, such as laser beams, is rotated by directing such beams onto the respective input faces of a pair of rhomboid prisms disposed in a plane generally perpendicular to the optical axis of the parallel input beams. The output beams from the pair of rhomboid prisms are parallel. Means are provided for rotating the rhomboid prisms about an axis or axes parallel to the optical axis of the input beams so as to rotate the plane defined by the pair of parallel output beams. In one embodiment, a single pair of rhomboid prisms is employed. Each prism is rotated about an axis of revolution coaxial with the respective input beam. In a second embodiment two pairs of rhomboid prisms are employed, one pair for each angular orientation of the plane defined by the output beams. The prisms are rotated about the optical axis of the input beams to rotate the plane of the output beams about the optical axis.

BRIEF DESCRIPTION OF THE DRAWINGS

FIG. 1 is a perspective view of a prior art rhomboid prism of the type employed in the present invention.

FIG. 2 is a perspective view of an optical system of the present invention for rotating the plane defined by parallel light beams, FIG. 3 is a view similar to that of FIG. 2 depicting a position of the optical system for rotating the plane of the output beam through 90°, FIG. 4 is a view similar to that of FIG. 2 depicting an alternative embodiment of the present invention, FIG. 5 is a view similar to that of FIG. 4 depicting an alternative embodiment of the system of FIG. 4, and FIG. 6 is a schematic perspective view depicting a series arrangement of optical rotating systems of the present invention.

DETAILED DESCRIPTION OF THE INVENTION

Referring now to FIG. 1 there is shown the prior art rhomboid prism 11, as previously employed for producing a lateral displacement between an input beam 12 and the resultant output beam 13. Briefly, the rhomboid prism 11 comprises a generally rhomboid shaped prism element 14 having an input face 15 disposed normal to the incident input beam 12. An internally reflecting end face 16 receives the input beam as transmitted through the input face 15 and internally reflects the beam longitudinally through the prism element 14 to a second internally reflecting face 17 which internally reflects the beam in a direction parallel to and laterally spaced from the input beam 12. The laterally displaced internally reflected beam exits through an output face 18 normal to the output beam 13. The internally reflecting end faces 16 and 17 are generally inclined at an angle of 45° to the plane of the input face 15.

Referring now to FIGS. 2 and 3, there is shown an optical system 19 of the present invention for rotating the plane defined by a pair of parallel input beams 21 and 22 from a first output plane which is coplanar with the input beams to a second output beam plane which is orthogonal to the plane of the input beams. More particularly, a first pair of rhomboid prisms 23 and 24, respectively, are disposed on a ring 25 having an axis of revolution coaxial with an optical axis 26 of the system 19 defined by the optical axis 26 of the pair of input beams 21 and 22. The input face portions 15 of the respective rhomboid prisms 23 and 24 are positioned to receive the respective rhomboid prisms 21 and 22. The prisms 23 and 24 are oriented such that their longitudinal axes extend laterally in opposite directions from the optical axis 26. The resultant output beams 21' 22' remain in the same plane as the input beams 21 and 22, i.e., are coplanar and are increased to a lateral spacing $b_1$, of generally twice the length l of the respective rhomboid prisms 23 and 24 plus the input beam spacing $b_0$.

The ring 25 is supported upon a pair of rollers 27 and 28, roller 28 being driven by a motor 29 for rotation of the ring 25 about the optical axis 26.

A second pair of rhomboid prisms 31 and 32 are disposed on the ring 25 with their respective input faces 15 laterally spaced apart by the lateral spacing $b_0$ of the pair of input beams 21 and 22 and with their longitudinal axes of the first pair of rhomboid prisms 23 and 24.

Referring now to FIG. 3, when the ring 25 is rotated in the counterclockwise direction through an angle $\phi$, which is somewhat less than 90°, where $tan\phi \simeq (b_2/b_0)$, the input beams 21 and 22 are incident on the respective input faces 15 of the second pair of rhomboid prisms 31 and 32 and the respective output beams 21' and 22' define a plane orthogonal to the plane of the input beams 21 and 22. The individual rhomboid prisms 31 and 32 are chosen of the proper length l which is slightly longer than the length of the first pair of rhomboid prisms 22 and 23 such that, in a preferred embodiment, the lateral spacing of the output beams 21' and 22' does not change with rotation of the plane of the output beams 21' and 22' from the zero degree rotation position to the 90° rotation position.

The optical beam rotation system 19 of FIGS. 2 and 3 is particularly useful for rotating the output beams in a laser doppler velocimeter as disclosed and claimed in U.S. Pat. No. 3,915,572 issued Oct. 28, 1975.

Referring now to FIG. 4 there is shown an alternative embodiment of the present invention. This optical rotation system 35 is similar to that of FIGS. 2 and 3 with the exception that only a single pair of rhomboid prisms 36 and 37 is employed. Each prism 36 and 37 is affixed to an individual disc 38 and 39 having an axis of revolution coaxial with the respective input beam 21 or 22, such discs 38 and 39 being driven from a drive wheel 41 which is driven from a motor 29 for turning each of the respective prisms in the same sense, i.e., either clockwise or counterclockwise at the same angular rate.

When the prisms 36 and 37 are oriented in the position as shown in FIG. 4, the plane defined by the pair of parallel output beams 21' and 22' is orthogonal to the plane of the input beams 21 and 22. The output beams have a lateral spacing $b_2$. However, when the motor 29 is energized and the respective prisms 36 and 37 are rotated in the counterclockwise direction so that each of the prisms has its longitudinal axis generally coplanar with the input beams 21 and 22, the output beams 21' and 22' are coplanar with the input beams 21 and 22 and have a substantially greater lateral spacing than in the orthogonal output position.

A second feature of the beam rotation system 35 is that the plane of the output beams 21' and 22' is continuously variable relative to the plane of the input beams. However, as aforementioned, the lateral spacing of the output beams varies with angular rotation of the plane of the output beams relative to the plane of the input beams.

Referring now to FIG. 5 there is shown an optical beam rotation system 45 similar to that of FIG. 4 with the exception that the individual prisms 36 and 37 are of shorter length relative to the lateral spacing $b_0$ of the input beams and the prisms are operated in the rotational regime wherein the output faces tend to rotate toward each other so that the lateral spacing of the output beams $b_2$ is less than the lateral spacing $b_0$ of the input beams 21 and 22.

Referring now to FIG. 6 there is shown an alternative embodiment of the present invention wherein a plurality of the beam optical rotation systems of FIGS. 2 and 3 are arranged in series for obtaining a series of selectable rotation angles $\theta_1$, $\theta_2$, and $\theta_3$, as desired.

The advantages of the beam rotation system of the present invention, as contrasted with the prior art, are that the rhomboid systems 19, 35 and 49 of the present invention are more compact than those proposed in the prior art, are less sensitive to small angular misalignments relative to the optical axis 26, employ only total internal reflections, thereby avoiding losses associated with mirrored surfaces and are achromatic in that they provide constant optical properties for different operating wavelengths. In the case of an application of the present invention to a laser velocimeter, the output beams would preferably have different lateral separations for the orthogonal positions in order to optimize sensitivity to the velocities being measured.

We claim:

1. In an optical system for rotating the plane defined by the first and second parallel light beams that are parallel to and equally spaced from a reference axis; first and second rhomboid prism means each having an input face disposed generally normal to a respective one of said first and second light beams for receiving thereon and transmitting the beam therethrough into each of the respective prisms, each of said prisms means having a first internal face inclined to the respective inputted light beam for internally reflecting the respective light beam within the respective prism, each of said prism means having an internal face generally parallel to said first internal face for internally reflecting the respective beam generally parallel to said respective inputted light beam, each of said prism means having an output face generally perpendicular to the light beam incident thereon for directing the light beam out of said prism generally parallel to said respective input light beam; and said first and second prism means being of substantially identical dimensions; rotating means for rotating each of said first and second prism means about an axis of revolution coincident with the first and second input light beams, respectively, for rotating the plane defined by said parallel first and second output light beams relative to the plane defined by said first and second input light beams; and said prism rotating means being formed and arranged for rotating each prism means through an angle of the same sense and magnitude so that the parallel output beams are parallel and equidistant to said reference axis.

2. In an optical system for rotating the plane defined by first and second parallel light beams; first and second pairs of rhomboid prism means, each prism means having an input face disposed generally normally to a respective one of the first and second light beams for receiving thereon and transmitting the beam therethrough into each of the respective prisms, each prism means having a first internal face inclined to the inputted light beam for internally reflecting the respective beam within the respective prism, each of said prism means having a second internal face generally parallel to said first internal face for internally reflecting the respective beam generally parallel to said respective inputted light beam, and each of said prism means having an output face generally perpendicular to the light beam incident thereon for directing the beam out of said prism means generally parallel to said respective input beam; said first pair of rhomboid prism means being disposed in a first position to receive on their respective input faces said first and second light beams, respectively; rotating means for rotating said first and second pairs of prism means about an axis of revolution which is disposed midway between the two parallel beams and which is parallel thereto; said second pair of prism means being disposed relative to said first pair of prism means so that when said first and second pairs of prism means are rotated to a second position said input faces of said second pair of prisms are brought into coincidence with said first and second light beams, whereby the plane defined by said first and second output light beams is rotated relative to the plane defined by said pair of input light beams.

3. The apparatus of claim 2 wherein said prism means of said first and second pair are elongated and wherein the length of said second pair of prism means is longer than that of said first pair.

4. The apparatus of claim 3 wherein said prism rotating means is formed and arranged for rotating each of said prism means through an equal angle of the same sense so that the output beams are parallel to said axis of revolution.

5. The apparatus of claim 2 wherein each of said rhomboid prism means is elongated and said first and second internal faces are disposed at 45° relative to the plane of said input face.

6. In a method for rotating the plane defined by first and second parallel light beams that are parallel to and equidistant from a reference axis, the steps of:
disposing first and second rhomboid prisms so that each of said prism means, having an input face, is disposed with its input face generally normal to a respective one of the first and second light beams so that the light beams received on each respective input face of each prism is transmitted through the input face into the respective prism, each of said prisms having a first internal face inclined to the respective inputted light beam for internally reflecting the respective light beam within the respective prism, each of said prisms having a second internal face generally parallel to the first internal face for internally reflecting the respective beam generally parallel to the respective inputted light beam, each of said prisms having an output face generally perpendicular to the light beam incident thereon for directing the light beam out of the prism generally parallel to the respective input light beam, the output light beams being parallel to and equidistant from said reference axis; simultaneously rotating said first and second prisms in one direction about an axis of revolution coincident with said reference axis for rotating the plane defined by said parallel first and second output light beams relative to the plane defined by said first and second input light beams.

* * * * *